J. C. COULOMBE.
FUEL FEEDING DEVICE.
APPLICATION FILED JAN. 15, 1916

1,395,224.

Patented Oct. 25, 1921.
2 SHEETS—SHEET 1.

WITNESSES:
J. Clyde Ripley
C. J. Remmel

INVENTOR
Joseph C. Coulombe,
BY
W. H. Barker
ATTORNEY

J. C. COULOMBE.
FUEL FEEDING DEVICE.
APPLICATION FILED JAN. 15, 1916.

1,395,224.

Patented Oct. 25, 1921.
2 SHEETS—SHEET 2.

WITNESSES:

INVENTOR
Joseph C. Coulombe,
BY
ATTORNEY

UNITED STATES PATENT OFFICE.

JOSEPH C. COULOMBE, OF LOWELL, MASSACHUSETTS.

FUEL-FEEDING DEVICE.

1,395,224.  Specification of Letters Patent.  Patented Oct. 25, 1921.

Application filed January 15, 1916. Serial No. 72,193.

*To all whom it may concern:*

Be it known that I, JOSEPH C. COULOMBE, a citizen of the United States, and a resident of Lowell, in the county of Middlesex and State of Massachusetts, have invented certain new and useful Improvements in Fuel-Feeding Devices, of which the following is a specification.

The invention relates, as indicated by its title, to a fuel feeding device, although it is applicable to any use in which it is desired to automatically raise from a low level supply, and distribute to a source, a liquid, which will always be under a substantially constant head and flow.

The object of the invention is to provide a simple apparatus in which, through the action of a reduced atmospheric pressure, a constant head or volume of flow may be secured to a given source, under all varying conditions of sub-atmospheric pressure and under all varying conditions of utilization of the flow of liquid to the point of supply.

A further object is to maintain, under all varying sub-atmospheric conditions, produced by the source of utilizing the fuel, a means for providing substantially constant conditions of delivery commensurate with all variations of sub-atmospheric conditions and adequate for the supply of fuel for all conditions under which the varying sub-atmospheric conditions are developed.

A still further object is to provide a primary and a secondary valve arrangement for initially and finally breaking the suction or sub-atmospheric condition between a suction chamber and an atmospheric distributing chamber.

It is also an object of the invention to provide means for readily securing a sub-atmospheric pressure by utilizing the inertia of a current of a moving fluid in conjunction with a specially designed nozzle.

It is admittedly not new in the art to provide a means for raising a liquid through the action of reduced atmospheric pressures so that the liquid may be distributed to any given point above the source of liquid supply. Various mechanisms have been devised for producing such a result, and the apparatus herein shown and described, while analogous to, is a distinct improvement upon my prior co-pending applications, Serial No. 32,927, filed June 8, 1915, and Serial No. 58,253, filed October 27, 1915.

In prior devices, so far as known to applicant and in fact in applicant's prior devices referred to above, there has been no adequate provision for insuring against flooding, due to the raising and lowering of the car or other device having a supply tank, which will normally and momentarily give a free feed of fuel to the fuel feeding device.

Furthermore, in devices as referred to, no provision has been made for insuring a proper feed under suction influences due to the varying conditions of suction of the engine when said engine is running on very high or very low speeds.

In devices of the art, suction of the engine has been relied upon for drawing up the liquid or fuel into a distributer chamber, and such devices have had a float controlled valve for determining the amount of fluid or fuel which should flow into the distributer. These float controlled valve devices have been controlled, in a measure, by a valve which would break the suction or vacuum effect upon certain rising of fluid or fuel in the chamber and would thereupon deliver a quantity of liquid or fuel from the suction chamber to the delivery chamber.

In these devices, reliance has been placed upon floats and valves in which the weight of the float and its buoyancy have been a determining factor. After the buoyancy of the float has been destroyed or made negligible, there has been a re-action upon the valve controlled thereby so that the liquid or fuel was delivered after or at about the time or period that the sub-atmospheric suction condition was destroyed or broken.

In the present device, provision has been made for an initial breaking or disrupting of the suction condition or sub-atmospheric condition so that the float or other controlling device of the valve will act more readily to provide a full actuation of the main valve.

In the present device, provision has been made for the sub-atmospheric conditions and at the same time to provide for unusually strong or abnormal sub-atmospheric conditions. The principle is based upon maintaining a vacuum or sub-atmospheric condition in the vacuum chamber without submitting said chamber to the unusual stresses which may occur from variations in the suction device (or manifold) which produces the suction effect upon said chamber.

The device is essentially designed to operate upon given or varying suction effects as they may actuate the devices in the suction chamber, but a further provision is made for controlling the flow of fluid or fuel into the suction chamber whenever the source of said liquid or fuel has a gravitational effect or flow with reference thereto. Such a condition arises when the source is raised above the point of distribution or suction.

Referring to the drawings.

Figure 7:
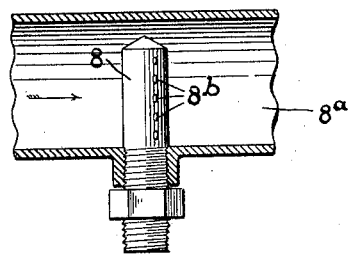
Fig. 7 is a detail view of the suction nozzle.
Figure 8:
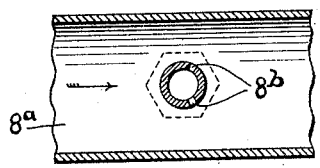
Fig. 8 is a sectional view through the nozzle and appurtenant parts illustrated in Fig. 7.

Referring, first to Figs. 1 to 4 inclusive and Figs. 7, 8, there is shown a main fuel supply A, connected by a pipe 1, with a distributing device B, which has a pipe connection 2, for providing sub-atmospheric conditions in the distributing device B, said connection being made with the suction side of an engine or like device. As illustrated, the connection 2, extends to the manifold or the main pipe connection intermediate the manifold and the carbureter mechanism D.

The distributing device B, consists of a substantially cylindrical casing 3, forming a vacuum chamber 4, and separated by a plate 5, from a distributing chamber 6. The distributing chamber 6, is of cylindrical form, and the preferable construction is to clamp the separating plate 5, between opposed flanges upon the tubular portion 3, and the tubular portion 6. The distributer B, has its upper chamber 4, connected through the suction pipe line 2, and valve nipple 7, with a nozzle 8, hereinafter described and which projects into the main suction line of the engine C, or similar device.

Figure 3:
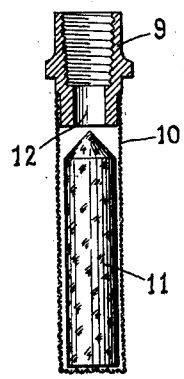
Fig. 3 is a detail sectional view of the auxiliary float of the liquid supply inlet.
Figure 4:
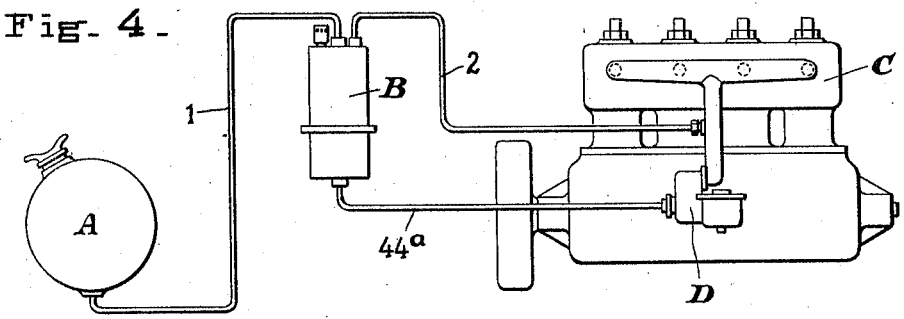
Fig. 4 is a diagrammatic view illustrating the arrangement of the several elements in conjunction with a liquid hydro-carbon motor.

The chamber 4, communicates through the pipe line 1, with the source of liquid supply carried in the tank A. It has, as illustrated in Fig. 3, a nipple 9, appended thereto, which has a cylindrical screen 10, which serves as a retainer for a buoyant float 11. This float 11, is intended, whenever there is an undue rise of liquid in the chamber 4, due to undue suction or due to the raising of the source A, above the distributing device while the same is under suction in the receptacle 4, to close the inlet port 12, of the main pipe line 1.

Under ordinary circumstances, the float 11, would remain inoperative. In the event of the liquid level in the chamber 4, rising to an undue level, the float 11, would close the port 12, and cut off further supply of liquid to the chamber 4, so that there can be no undue flooding or undue rise in the level of the liquid or fuel within the chamber 4.

This float 11, with its valve for closing the inlet 12, is designed to insure proper action, even when the supply tank A, is raised higher than the distributing device B. Such a condition could readily be maintained upon a boat or any vehicle of any character and size, and will re-act to prevent undue flooding of the receptacle or chamber 4. Within the chamber 4, is arranged a float spindle 13, secured to the upper head 14 of the casing and provided with a cam having a long gradual slope 15, and a short slope 16, to control, in a measure, the rise and fall of a buoyant float 17. There is a pronounced shoulder 15ª, between the cam faces 15 and 16.

The float spindle 13, projects through a bushing 18, arranged in the float 17, said bushing 18, having locked to its upper end by a nut 19, spring-fingers 20.

The spring-fingers 20, are designed to ride over the cam surface 15, upon an upward movement of the float 17, and to hold temporarily upon the cam face 16, when conditions are such that the float should drop.

The lower end of the member 18, has a sliding pin and slot connection 21, 22, with a valve-lever 23, which, as illustrated, is pivoted as at 24, to a suitable bracket 25.

This valve-lever 23, at its forward end, is pivoted as at 26, to the upper section 27, of a valve stem which controls the operation of a primary valve 28, and a main valve 29.

The primary valve 28, and main valve 29, control a port 30, between the chamber 4, and the chamber 6, and the valve 28, is formed upon the upper end of the lower valve stem 31. The valve 28, controls a port 32, and the lower section of its stem 31, moves in a guide piece 33.

It is quite obvious, from the above description, that as partial vacuum is produced in the chamber 4, liquid will be drawn into said chamber through the pipe line 1, past the float 11, and through its port 12. As soon as the level of liquid rises sufficiently, the float 17, will be raised, and due to the spring-fingers 20, will be slowly forced up until it opens the valve 28. During this operation, air will percolate into the chamber 4, reducing the suction effect so that the main valve 29, may be more readily opened by the float. A further movement of the float over the shoulder 15ª between the cam 15, and cam 16, will open the main valve 29, and thereupon, the liquid in the chamber 4, will pass into the chamber 6.

Chamber 6, is open to atmospheric pressure through a connection 34, which extends upwardly through the chamber 4, and terminates in a splash pot 35.

The purpose and object of the primary and secondary valves should be obvious. At the first movement of the float, a sufficient quantity of liquid enters the chamber 4, to raise said float which will open the small valve 28. Thereupon, atmospheric air will bubble through said valve and partially break the vacuum in the chamber 4. The float is then enabled to readily open the main valve 29, even against the vacuum which holds it to its seat. With this arrangement, a very delicate adjustment can be secured with reference to the buoyancy of the float, the height of the liquid and the proper opening of the valves 28, 29, to permit said liquid to pass into the chamber 6.

The suction connection 2, may be made direct with the chamber 4, but in order to insure a delicate action, it is desirable to have said suction connection open with full force and effect within operative limits, and then restricted to a degree which will not destroy the sub-atmospheric condition of the chamber 4.

It is quite obvious that with an engine running at varying speeds, there might be certain high speed effects of a momentary character which would cause undue reduction of pressure in the chamber 4, with a consequent over-supply of liquid in said chamber. Any valve mechanism which would positively shut off all this suction effect, would undoubtedly interfere with a delicate re-action of the parts.

To overcome these difficulties, the nipple 7, is provided with a valve seat 36, upon which normally rests a valve 37, which has a suitable play between the seat of the valve 36, and the opposed valve seat 38. Ordinarily, under varying suctions, the valve 37, would flutter between its seat and the seat 38. In the event of undue suction, it would be drawn against the seat 38. About the valve seat 38, is provided an annular passage 39, with a small opening 40, communicating with said passage and with the passage beyond the valve seat 38. It is therefore apparent that, even with the valve 37, pulled against the seat 38, a sufficient suction would be maintained to prevent destroying of the vacuum or any substantial modification thereof in the chamber 4.

To secure the best degree of suction from the manifold of the engine C, or similar device, a nozzle 8, may be used. This nozzle projects into and across the manifold pipe 8ª, and is in the form of a tube having a closed end with perforations 8ᵇ, radially disposed and slightly in advance of the center of the tube. These perforations 8ᵇ, extend along the tube within the manifold, and due to the inertia of the current of gases passing through the manifold, as indicated by the arrow in Figs. 7 and 8, materially enhance and steady the suction values in the pipe line 2, and chamber 4.

The inertia of the gas or liquid passing through the manifold affects the suction values by increasing the suction. The location of the plug in the manifold increases the speed of the gas as it passes by it; the greatest speed of velocity being reached at the center line which, according to the laws of fluids in motion in a pipe or confined area, produces a greater depression at this point than would exist otherwise. It is therefore desirable to place the radial holes just above the center line of the plug which projects into the manifold.

Figure 1:
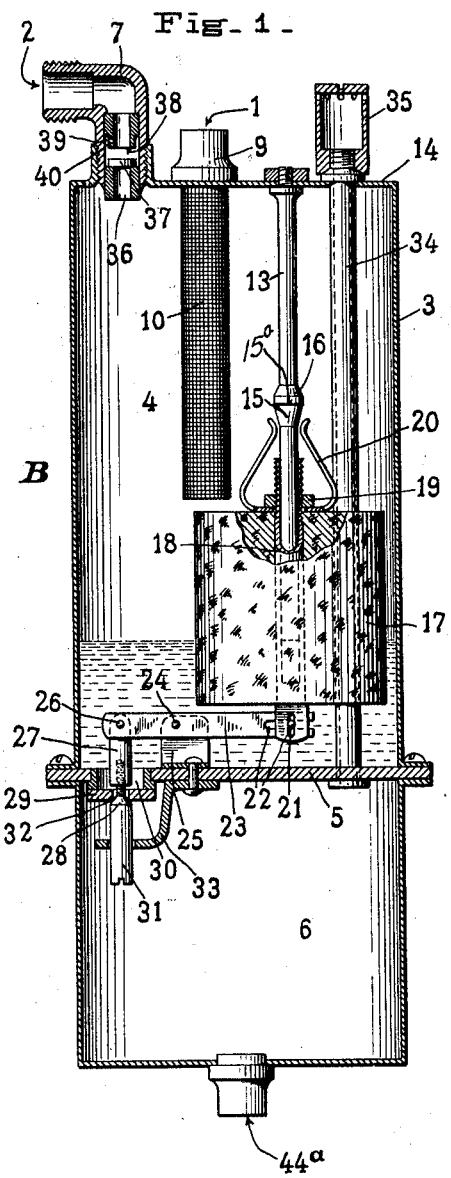
Figure 1 is a vertical section illustrating the mechanism.
Figure 2:
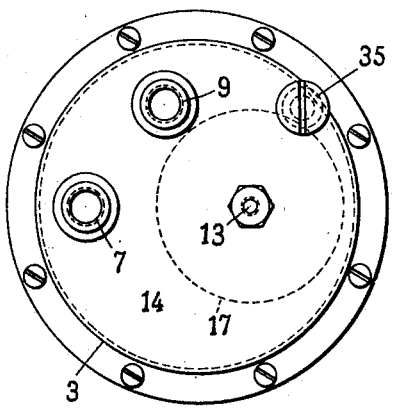
Fig. 2 is a top plan view.
Figure 5:
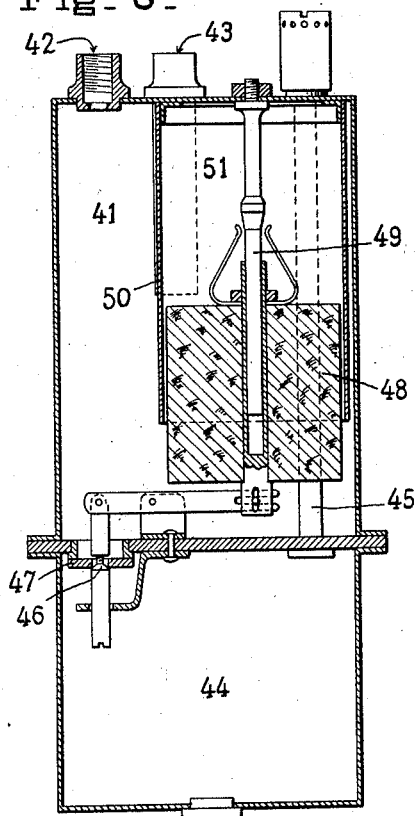
Fig. 5 is a vertical section similar to that of Fig. 1, illustrating a slightly modified arrangement.
Figure 6:
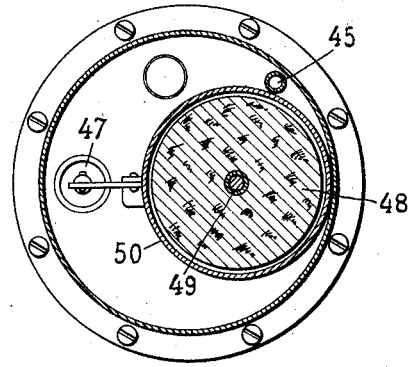
Fig. 6 is a detail view in cross section through the device of Fig. 5.

In Fig. 5 the same mechanism illustrated in Fig. 1 is shown with a slightly modified arrangement of float and float chamber.

In said figure, the main suction chamber 41, has a suction connection (shown without the valve nipple of Fig. 1) 42, and a fluid inlet connection 43. The lower distributing chamber 44, has an atmospheric air connection 45, a primary valve 46, and main valve 47, substantially as illustrated in Fig. 1.

There is also a float 48, having connections with the valves 46, 47, and guided by a spindle 49, all as heretofore described.

Surrounding the float 48, there is a dependent tubular member 50, which forms a float chamber 51. The tubular member 50 extends downwardly, and as the liquid is drawn into the chamber 41, and rises carrying with it the float 48, it will form a liquid seal at the lower end of the tubular member 50, sealing the connection between the chamber 41, and the float chamber 51. Obviously, the rate of rise of the liquid in the chamber 41, will be greater than that in the float chamber 51. Eventually, the buoyancy of the float 48, will carry it up to open the primary and secondary valves 46, 47. Thereupon, the level of the liquid of the chamber 41, will drop and when said level falls below the bottom of the tubular casing 50, the liquid seal will be broken and the float 48, will drop with considerable force, positively closing the primary and secondary valves 46, 47. This is due to its weight and lack of buoyancy. It is also a fact that the tubular casing is subject to the main suction prior to the filling of the said casing with liquid.

It is to be understood that the spring-fingers 20, and cams 15, 16, shown and described in conjunction with the valve stem of Fig. 1 might be dispensed with, and that the float 17, of Fig. 1 or 48, of Fig. 5 might be relied upon to give the proper action. It has been found advantageous, however, to utilize such an arrangement in order to first retard the buoyant action of the float 17, of Fig. 1 or 48, of Fig. 5 during the opening of the primary valve 28, of Fig. 1 or the valve 46, of Fig 5; then, giving a quick action for the opening of the main valve 29, of Fig. 1 or 47, of Fig. 5 and subsequently giving a quick drop to the float 17, of Fig. 1 or 48, of Fig. 5 to positively close the primary and secondary valves as above enumerated.

It is understood, of course, that the distributing chamber 44, is connected through a pipe line 44ª, with the carbureter D, or other device, to which the liquid is to be distributed. Said carbureting device may be of any well known type.

It will also be observed that the primary and secondary valve connections, both of which are under influence of the reduced atmospheric pressure of the chamber 4, of Fig. 1, or 41, of Fig. 5, may be readily and accurately controlled by the float, and that it will not be necessary to employ an unusually large float to overcome the suction and permit the liquid to drop into the distributing chamber.

These features, in conjunction with the provision for preventing flooding when the supply tank is above the distributer, which may be under suction, give a balance system which insures a nicety and delicacy of action under any and all conditions.

Obviously, the exact detail and arrangement of the parts and elements may be modified to a considerable extent without departing from the spirit or intent of the invention which contemplates a device having a delicate, though positive operation, heretofore described.

Obviously, in such engines, the gaseous mixture is produced by the suction of the engine through the carbureter. It will be equally obvious that the proper attenuation of the gaseous mixture would be disturbed, ordinarily by breaking the vacuum of the suction chamber 4, and permitting atmospheric air to be drawn into the manifold of the engine.

In the arrangement herein described, the primary valve 28, as it opens, permits ebullition of the atmospheric air through the body of fuel contained in the chamber 4. This gives a complete saturation for said atmospheric air so that the chamber 4 always contains a gaseous mixture of a sufficient richness to maintain a proper gas condition in the manifold. The same effect results when the secondary valve 29, is open.

In fact, there is no pure atmospheric air drawn into the manifold from the suction chamber, and therefore no breaking down of the richness of the mixture produced by the suction through the carbureter.

In devices of the prior art so far as known, and with the exception of the co-pending cases hereinabove referred to, the breaking of the vacuum is effected through a valve mechanism directly connected with the suction chamber, and in such devices, atmospheric air in varying quantities, depending upon throttling of the engine, is drawn into the manifold above the point of carburetion.

This is a fault which is entirely overcome in the apparatus herein disclosed, and the correction of the fault is largely made possible by providing a primary valve through which a comparatively small quantity of atmospheric air passes and ebullates through the fuel in the suction chamber. This gives a full, rich mixture at all times in the suction chamber.

What I claim as my invention and desire to secure by Letters Patent is:

1. In a fuel feeding device having a suction chamber, a distributing chamber, a connection from the suction chamber to a source of suction, a connection from the suction chamber to a source of liquid supply, said distributing chamber open to atmospheric pressure; of a valve opening between the two chambers, a primary valve and a secondary valve controlling said opening, and means dependent upon the rise of liquid in the suction chamber for opening said valves.

2. In a fuel feeding device having a suction chamber, a distributing chamber, a connection from the suction chamber to a source of suction a connection from the suction chamber to a source of liquid supply, said distributing chamber open to atmospheric pressure; of a valve opening between the two chambers, a combined primary valve and a secondary valve controlling said opening, said valves opening toward the distributing chamber and means dependent upon the rise and fall of liquid in the suction chamber for controlling said valves.

3. In a fuel feeding device, a suction chamber, a distributing chamber, a connection from the suction chamber to a source of suction a connection from said chamber to a source of liquid supply, said distributing chamber being constantly open to atmospheric pressure; a valve opening between the two chambers, a primary valve and a secondary valve controlling said opening, means dependent upon the rise of liquid in the suction chamber for opening and closing said values, and an independent valve automatically actuated upon abnormal rise of liquid in the suction chamber for cutting off the liquid supply to the suction chamber.

4. In a device of the character described, a suction chamber, a distributing chamber, a source of liquid supply, a suction connection for the suction chamber, an atmospheric connection for the distributing chamber extending through the suction chamber and terminating at the upper end of the distributing chamber, a primary valve and a combined secondary valve controlling the flow of fuel from the suction chamber and the admission of atmospheric air thereto, and a float controlled by the liquid level of the suction chamber and controlling said valves.

5. In a device of the character described, a suction chamber, a distributing chamber, a source of liquid supply, a suction connection for the suction chamber, an atmospheric connection extending to the lower side of the suction chamber, a valve-opening at the bottom of the suction chamber opening into the distributing chamber and through which the liquid of the suction chamber passes by gravity, a float actuated valve controlling said opening and adapted to equalize the relative pressures of the suction chamber and distributing chamber and controlling the flow of fluid from the former to the latter, said valve consisting of a main valve member and a primary valve seated therein, a float device and connections therewith for operating the valves.

6. In a device of the character described, a suction chamber, a distributing chamber, a source of liquid supply, a suction connection for the suction chamber located above the highest liquid level of said chamber, an atmospheric connection extending below the lowest level of the suction chamber, a valve-opening between the suction chamber and distributing chamber through which the liquid contents of the former flows to the latter under gravity, float controlled means in the suction chamber for controlling admission of atmospheric air to said chamber as it is delivered by the atmospheric connection, said means also controlling the flow of liquid from the suction chamber to the distributing chamber, and said valve-opening and means providing the only atmospheric inlet to the suction chamber and the only outlet for the flow of liquid by gravity from said chamber to the distributing chamber.

7. In a device of the character described, a suction chamber, a distributing chamber, float controlled means for controlling liquids passing from one of said chambers to the other, a source of liquid supply for the suction chamber, a suction connection for said chamber, and a valve in said connection, a valve seat below said valve coöperating with the valve to close the suction chamber, a valve seat above said valve provided with by-pass openings for maintaining normal suction in the suction chamber under abnormal condition of suction in the suction connection.

8. In a device of the character described, a suction chamber, a distributing chamber, a source of fuel supply, a connection therefrom to the suction chamber, a suction connection for said chamber terminating in the manifold of an engine, a connection from the distributing chamber to the carbureter of an engine for supplying fuel thereto by gravity, an atmospheric inlet extending into the distributing chamber, a valve-opening extending between the suction chamber and distributing chamber and forming the sole means for the admission of atmospheric air to the suction chamber and the flow of liquid to the distributing chamber by gravity, a valve mechanism controlling said opening and comprising a main valve covering the valve-opening between the chambers and a primary valve seated in the main valve, said primary valve having a movement independent of the movement of the main valve, and float controlled means in the suction chamber connected with the primary valve and adapted to open and close said valve and its coöperating main valve dependent upon the rise and fall of liquid in the suction chamber.

9. In a device of the character described, a suction chamber having a suction connection with the intake pipe of an internal combustion engine, said connection terminating within the intake pipe and having a series of perforations arranged therein and subject to the action due to the inertia of the current of gases passing through said intake pipe whereby the suction effect in the suction chamber is enhanced.

10. In a device of the character described, a suction chamber having a suction connection with the intake pipe of an internal combustion engine, said connection terminating within the intake pipe and having a closed end and provided with a series of perforations arranged at one side of its axial center and adapted to be acted upon by the inertia of the current of gases passing over said perforated terminal as they are drawn through the intake pipe thereby enhancing the suction effect in the suction chamber.

11. In a device of the character described, a suction chamber having a suction connection with the intake pipe of an internal combustion engine, said connection terminating in a hollow plug, said hollow plug projecting into and centrally across the intake pipe at right angles thereto, said plug having a series of perforations at each side of a horizontal plane which is co-incident with the longitudinal axis of the plug, said perforations acted upon by the inertia of the current of gases passing through the intake pipe and past the transverse hollow plug member.

12. In a device of the character described, a suction chamber, a distributing chamber, said suction chamber closed except for its connection with a source of suction and its connection with a source of liquid supply, said distributing chamber being always open to atmospheric pressure, a valve-opening between the two chambers, a valve controlling said valve-opening, a valve spindle loosely connected with said valve and having a valve seated in the first-named valve, and means within the suction chamber connected with said valve spindle for operating the valve dependent upon the rise and fall of level of fluid in the suction chamber, said valve controlling the flow of liquid from the suction chamber to the distributing chamber and permitting the movement of air from the distributing chamber to the suction chamber simultaneously to reduce the suction in the suction chamber.

13. In a device of the character described, having a suction chamber and a distributing chamber and a valve opening between the two chambers, said suction chamber being closed except for said valve-opening and a suction connection and a liquid supply connection, said distributing chamber being open to atmospheric pressure; of a valve for said valve-opening influenced by the suction of the suction chamber and the atmospheric pressure in its closing movement, an operating spindle for said valve extending through the valve-opening into the suction chamber, and means within said suction chamber connected with said valve spindle for operating the valve upon a pre-determined rise and fall of level of fluid in the suction chamber, said valve controlling the flow of liquid from the suction chamber to the distributing chamber and controlling the reduction of suction in the suction chamber to permit said flow under gravity.

14. In a fuel feeding device having a suction chamber, a distributing chamber, a connection from the suction chamber to a source of suction, a connection from the suction chamber to a source of liquid supply, said distributing chamber open to atmospheric pressure; of a valve-opening between the two chambers, a primary valve and a secondary valve controlling said opening, valve connections for operating said valves extending through the valve-opening, and means for actuating said connections upon the rise and fall of liquid in the suction chamber for opening and closing said valves.

15. In a fuel feeding device having a suction chamber, a distributing chamber, a connection from the suction chamber to a source of suction, a connection from the suction chamber to a source of liquid supply, said distributing chamber open to atmospheric pressure; of a valve-opening between the two chambers, a valve controlling said opening, a float for operating said valve dependent upon a pre-determined rise and fall of level of liquid in the suction chamber, and means for retarding the action of said float during the rise and fall of the liquid level.

16. In a device of the character described, having a suction chamber, a distributing chamber, a connection from the suction chamber to a source of suction, a connection from said chamber to a source of liquid supply, said distributing chamber open to atmospheric pressure; of a valve-opening between the two chambers, a valve controlling said opening, means dependent upon the rise and fall of liquid in the suction chamber for opening and closing said valve, and an independent float-controlled valve for closing the connection of the source of liquid supply upon abnormal rise of liquid in the suction chamber.

17. In a device of the character described, having a suction chamber, a distributing chamber, means for controlling the flow of liquid from the suction chamber to the distributing chamber, a connection from the suction chamber to a source of suction, a connection from said chamber to a source of liquid supply, a strainer tube extending into the suction chamber from the liquid supply connection, said strainer forming a guide for an automatic valve, and a buoyant automatic valve arranged in said strainer and adapted to close the liquid supply connection upon abnormal rise of level of liquid in the suction chamber.

18. In combination with a main low level liquid supply tank, a liquid supply receptacle located in a plane above said tank and closed except as to connections hereinafter mentioned; a liquid supply connection from said tank to said receptacle; a supplemental chamber and connections from the receptacle to said chamber for discharge of liquid by gravity from the receptacle into the chamber; an exhaust connection to the receptacle for reducing the pressure therein below that of the atmosphere; an atmosphere inlet connection to the upper part of the supplemental chamber; a valve which controls the communication of the receptacle with the chamber, positioned so as to be assisted in opening by the gravity flow of the liquid from the receptacle into the chamber; a device in the receptacle which is operated in one direction by the accumulation of liquid in the receptacle and in the opposite direction by the withdrawal of liquid from the receptacle; operating connections from said device to said valve for positively opening and closing it, the passage which connects the receptacle with the supplemental chamber being large for free and rapid discharge of the liquid from the receptacle into the chamber, whereby it is adapted also to permit the movement of air from the chamber into the receptacle simultaneously with the movement of liquid from the receptacle into the chamber.

JOSEPH C. COULOMBE.

Witnesses:
 BESSIE ABRAMSON,
 EDITH J. REMOND.